3,766,273
N,N'-BIS-TRIFLUOROMETHYLTETRAFLUORO-
ETHYLENE DIAMINE
Erich Klauke, Odenthal-Hahnenberg, and Hans Holt-
schmidt, Leverkusen-Steinbuchel, Germany, assignors
to Bayer Aktiengesellschaft, Leverkusen, Germany
No Drawing. Filed Mar. 3, 1971, Ser. No. 120,743
Claims priority, application Germany, Mar. 20, 1970,
P 20 13 435.4
Int. Cl. C07c 87/14, 87/16
U.S. Cl. 260—583 GG                   1 Claim

ABSTRACT OF THE DISCLOSURE

Novel N,N'-bis-trifluoromethyltetrafluoroethylene diamine as prepared by reacting tetrachloroethylene-1,2-bis-isocyanide dichloride with anhydrous hydrofluoric acid until hydrogen chloride evolution ceases. This novel compound is useful in organic synthesis and directly as an insecticide.

---

This invention relates to a novel compound, N,N'-bis-trifluoromethyltetrafluoroethylene diamine, and to a process for its production.

This compound is obtained by reacting a compound corresponding to the formula:

$$Cl_2C=N-CCl_2-CCl_2-N=CCl_2$$

with anhydrous hydrofluoric acid until hydrogen chloride evolution ceases.

The novel compound corresponds to the formula:

$$CF_3-\underset{H}{N}-CF_2-CF_2-\underset{H}{N}-CF_3$$

The reaction by which it is obtained is carried out at a temperature in the range from −10 to +150° C., preferably at a temperature in the range from 0 to 100° C. and more particularly at a temperature in the range from 50 to 80° C.

In the aromatic series, the reaction of an isocyanide dichloride with anhydrous hydrogen fluoride to form sec-trifluoromethyl anilines has been illustrated by several examples (K. A. Petrov and A. A. Neimysheva, J. Gen. Chem. U.S.S.R. 29, 2135 (1959), Engl. translation, German Pat. No. 1,170,414 (1964)).

Perfluorinated secondary aliphatic diamines are unknown.

The fact that the claimed process can be carried out without secondary reactions must be regarded as extremely surprising.

The starting compound used for the process is known (Ang. Chem. 74, 853 (1962) and Ang. Chem., 80, 952 (1968)).

The claimed process is best carried out in a nickel or vanadium-steel vessel (stainless steel with Ni, Cr and V) by combining the components at a temperature below the boiling point of the hydrogen fluoride and then slowly heating them to an elevated temperature. The reagents which initially react with one another in heterogeneous phase dissolve in one another during the fluorination stage. This is accompanied by the vigorous evolution of HCl. The evolution of gas can be followed at temperatures of up to 20° C. by means of a bubble counter. At an elevated temperature and under pressure, the hydrogen chloride evolved is relieved of pressure through a regulating valve at a pressure above the vapour pressure of the hydrogen flouride. The reaction is over when no more hydrogen chloride is evolved.

The chlorine-fluorine exchange reaction can be carried out over a wide temperature range. If the reaction is performed without pressure, a complete exchange can be obtained over about 5 days at 10 to 20° C. The reaction time is considerably shortened by working under pressure, as perferred. Thus, exchange is completed over substantially four hours at 50° C., although smooth fluorination untroubled by secondary reactions can also be obtained at higher temperatures of, for example, 100° C. and higher.

At least 10 mols of hydrogen fluoride are required for the complete reaction of one mol of bis-isocyanide dichloride. However, it is preferred to use twice to three times the theoretically necessary quantity and to recover the excess on completion of the reaction through distillation. The reaction can, of course, also be carried out in the presence of an organic solvent such as methylene chloride, chlorbenzene or an ether. In some cases, this can be of advantage in order to introduce the starting material into the hydrogen fluoride already present in the reaction vessel or to separate the reaction product off from excess hydrogen fluoride on completion of the reaction.

The reaction product is worked up in the usual way, usually by distillation. If desired, excess hydrogen fluoride can be combined without heat beforehand by the usual acid-binding agents such as tert-amines, alkali metal or alkaline earth metal fluorides, preferably NaF.

The novel N,N'-bis-trifluoromethyltetrafluoroethylene diamine obtainable by the process according to the invention is a colourless liquid of B.P. 70 to 72° C., $n_D^{20}$ 1.2778. It can be used for organic syntheses or directly as an inescticide.

Plutella test:
  Solvent: 3 parts by weight of dimethyl formamide
  Emulsifier: 1 part by weight of alkylaryl polyglycol ether (substituted phenol reacted with 11 mols of ethylene oxide).

To prepare a suitable active-ingredient preparation, 1 part by weight of the active ingredient is mixed with the specified quantity of solvent containing the specified quantity of emulsifier and the concentrate is diluted with water to the required concentration.

Cabbage leaves (*Brassica oleracea*) are sprayed with the active ingredient preparation until dew-moist and then infected with caterpillars of the cabbage moth (*Plutella maculipennis*).

The mortality rate in percent is determined after the time intervals indicated. 100% means that all the caterpillars were killed whilst 0% means that none of the caterpillars was killed.

The active ingredients, the active ingredient concentration, the evaluation times and the results are set out in the following table:

TABLE

| Active ingredients | Plant-damaging insects | |
|---|---|---|
|  | Active-ingredient concentration in percent | Mortality rate in percent after 3 days |
| 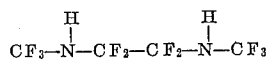 | 0.2 | 100 |

Phaedon larvae test:
  Solvent: 3 parts by weight of dimethyl formamide
  Emulsifier: 1 part by weight of alkylaryl polyglycol ether (substituted phenol reacted with 11 mols of ethylene oxide).

To prepare a suitable active ingredient concentration, 1 part by weight of the active ingredient is mixed with the specified quantity of solvent containing the specified quantity of emulsifier and the concentrate is diluted with water to the required concentration.

Cabbage leaves (*Brassica oleracea*) are sprayed with the active ingredient preparation until they are dripping wet, and then infected with horseradish beetle larvae (*Phaedon cochleariae*).

The mortality rate in percent is determined after the time intervals indicated. 100% means that all the beetle larvae were killed, 0% means that none of the larvae was killed.

The active ingredients, the active ingredient concentrations, the evaluation times and the results are set out in the following table:

TABLE

| Plant-damaging insects | | |
|---|---|---|
| Active ingredients | Active-ingredient concentration in percent | Mortality rate in percent after 3 days |
| $\begin{array}{c} H \\ CF_2-N-CH_3 \\ | \\ CF_2-N-CF_3 \\ H \end{array}$ | 0.2 | 100 |

EXAMPLE 900 ml. of hydrogen fluoride are run at substantially 0° C. into 800 g. of tetrachloroethylene-1,2-bis-isocyanide dichloride in a 2-litre capacity autoclave of stainless steel equipped with a stirring mechanism, thermometer and reflux condenser, followed by an exhaust-gas regulating valve.

The autoclave is then closed, 3 atms. protective nitrogen pressure admitted, followed by heating for 1 hour to 70° C. The reaction mixture is left reacting for 1 hour at 70° C., after which the hydrogen chloride liberated during the reaction is let off through the exhaust valve at a pressure of 6 atms. The contents of the autoclave are then heated at 100° C. to start them reacting again, after which they are left to react to completion under a venting pressure of from 12 to 13 atms. After cooling, the reaction product is distilled through an active column. After some first runnings of excess hydrogen fluoride, 470 g. of N,N'-bis-trifluoromethyltetrafluoroethylene diamine are obtained, M.P. 70 to 72° C./760 Torr, $n_D^{20}$ 1.2778.

A multiplett for the $CF_3$ groups appears at $-22.1$ p.p.m. in the 19-F-NMR, and for the $CF_2$ groups at $+19.3$ p.p.m. (standard $CF_3COOH$ ext.).

The same result is also obtained in the absence of an inert gas pressure.

What we claim is:

1. N,N'-bis-trifluoromethyltetrafluoroethylene diamine.

References Cited

UNITED STATES PATENTS 2,616,927  11/1952  Kauck et al. __ 260—583 GG X

FOREIGN PATENTS 1,170,414  5/1964  Germany _____ 260—583 GG

LEWIS GOTTS, Primary Examiner

R. L. RAYMOND, Assistant Examiner

U.S. Cl. X.R.

424—325